United States Patent
Gadgil et al.

(10) Patent No.: US 8,303,919 B2
(45) Date of Patent: Nov. 6, 2012

(54) SYSTEM AND METHOD FOR PROTECTION OF SCR CATALYST AND CONTROL OF MULTIPLE EMISSIONS

(75) Inventors: Mandar R. Gadgil, Akron, OH (US); S. Behrooz Ghorishi, Uniontown, OH (US); Bryan J. Jankura, Uniontown, OH (US)

(73) Assignee: Babcock & Wilcox Power Generation Group, Inc., Barberton, OH (US)

( * ) Notice: Subject to any disclaimer, the term of this patent is extended or adjusted under 35 U.S.C. 154(b) by 0 days.

(21) Appl. No.: 12/909,753

(22) Filed: Oct. 21, 2010

(65) Prior Publication Data
US 2012/0100052 A1    Apr. 26, 2012

(51) Int. Cl.
*B01D 53/46* (2006.01)
*B01D 53/64* (2006.01)
*B01J 33/00* (2006.01)

(52) U.S. Cl. ......... 423/210; 502/439; 502/520; 502/521

(58) Field of Classification Search .................. 423/210; 502/439, 520, 521
See application file for complete search history.

(56) References Cited

U.S. PATENT DOCUMENTS

| | | | |
|---|---|---|---|
| 4,061,716 A | 12/1977 | McGauley | |
| 4,572,085 A | 2/1986 | Hepworth | |
| 4,843,980 A | 7/1989 | Markham et al. | |
| 4,871,522 A | 10/1989 | Doyle | |
| 4,925,633 A | 5/1990 | Doyle | |
| 5,540,897 A | 7/1996 | Chu et al. | |
| 5,567,394 A | 10/1996 | Chu et al. | |
| 5,585,081 A | 12/1996 | Chu et al. | |
| 2002/0009404 A1* | 1/2002 | Tsybulevskiy et al. | .. 423/244.04 |
| 2005/0261122 A1* | 11/2005 | Quesada Perez et al. | ........ 502/80 |
| 2007/0140940 A1 | 6/2007 | Varma et al. | |
| 2007/0243996 A1* | 10/2007 | Pujado | ............................. 502/38 |
| 2010/0273643 A1 | 10/2010 | Gadgil et al. | |

OTHER PUBLICATIONS

W.A. Punjak et al.; Aluminosilicate Sorbents for Control of Alkali Vapors during Coal Combustion and Gasification; Energy and Fuels, vol. 2(5), 1988, pp. 702 to 708.
W.A. Punjak et al.; High-Temperature Adsorption of Alkali Vapors on Solid Sorbents; AIChE Journal, vol. 35(7), Jul. 1989, pp. 1186 to 1194.
M. Uberoi et al.; The Kinetics and Mechanism of Alkali Removal from Flue Gas by Solid Sorbents; Progress in Energy and Combustion Science, vol. 16(4), 1990, pp. 205 to 211.
M. Uberoi et al.; Aluminosilicates as Potential Sorbents for Controlling Metal Emissions; Clean Energy from Waste and Coal, ACS Symposium, 1992, pp. 214 to 222.
P.O. Mwabe et al.; Mechanisms Governing Trace Sodium Capture by Kaolinite in a Downflow; Twenty-Sixth Symposium (International) on Combustion, The Combustion Institute, 1996, pp. 2447 to 2453.
B.M. Steenari et al.; High-Temperature Reactions of Straw Ash and the Anti-Sintering Additives Kaolin and Dolomite; Biomass and Bioenergy, vol. 14(1), Mar. 1998, pp. 67 to 76.

(Continued)

Primary Examiner — Timothy Vanoy
(74) Attorney, Agent, or Firm — Eric Marich

(57) ABSTRACT

The present invention relates generally to the field of emission control equipment for boilers, heaters, kilns, or other flue gas-, or combustion gas-, generating devices (e.g., those located at power plants, processing plants, etc.) and, in particular to a new and useful method and apparatus for preventing the poisoning and/or contamination of an SCR catalyst. In another embodiment, the method and apparatus of the present invention is designed to protect an SCR catalyst, while simultaneously providing emission control.

26 Claims, 1 Drawing Sheet

OTHER PUBLICATIONS

S.Q. Turn et al.; A Review of Sorbent Materrials for Fixed Bed Alkali Getter Systems in Biomass Gasifier Combined Cycle Power Generation Applications; Journal of the Institute of Energy, vol. 71, Dec. 1998, pp. 163 to 177.

S.B. Davis et al.; Competition for Sodium and Toxic Metals Capture on Sorbents; Aerosol Science and Technology, vol. 32(2), Feb. 2000, pp. 142 to 151.

M. Ohman et al.; The Role of Kaolin in Prevention of Bed Agglomeration during Fluidized Bed Combustion of Biomasss Fuels; Energy & Fuels, vol. 14, 2000, pp. 618 to 624.

V. V. Lissianski et al.; Utilization of Iron Additives for Advanced Control of NOx Emissions from Stationary Combustion Sources; Ind. Eng. Chem. Res. 2001 (published on the Internet on Jun. 22, 2001), 40, pp. 3287 to 3293.

S.Q. Turn et al.; An Experimental Investigation of Alkali Removal from Biomass Producer Gas Using a Fixed Bed of Solid Sorbent; Ind. Eng. Chem. Res., vol. 40, 2001, pp. 1960 to 1967.

T.K. Gale et al.; High-Temperature Interactions Between Multiple-Metals and Kaolin; Combustion and Flame vol. 131 (3), Nov. 2002, pp. 299 to 307.

T.K. Gale et al.; Mechanisms and Models Describing Sodium and Lead Scavenging by a Kaolinite Aerosol at High Temperatures; Aerosol Science and Technology, vol. 37, 2003, pp. 865 to 876.

T. Ake et al.; Limestone Injection for Protection of SCR Catalyst; Riley Power, Duke Energy, Cormetech, Inc. Paper #175, 2003.

K.Q. Tran et al.; On the Application of Surface Ionization Detector for the Study of Alkali Capture by Kaolin in a Fixed Bed Reactor; Fuel, vol. 83(718), May 2004, pp. 807-812.

Q.K. Tran et al.; Capture of Potassium and Cadmium by Kaolin in Oxidizing and Reducing Atmospheres; Energy & Fuels, vol. 18, 2004, pp. 1870 to 1876.

K.Q. Tran et al.; A Kinetic Study of Gaseous Alkali Capture by Kaolin in the Fixed Bed Reactor Equipped with an Alkali Detector; Fuel, vol. 84(2/3), Jan./Feb. 2005, pp. 807-812.

V. Kroger; Poisoning of Automotive Exhaust Gas Catalyst Components—The Role of Phosphorus in the Poisoning Phenomena; Academic Dissertation, University of Oulu, Finland—2007.

B. Jens et al.; The Behavior of Particle Bound Phosphorus During the Combustion of Phosphate Doped Coal; Fuel, 86, 2007 (available online Sep. 27, 2006), pp. 632 to 640.

E. Matinde et al.; Phosphorus Gasification from Sewage Sludge During Carbothermic Reduction; ISIJ International, vol. 48, 2008, No. 7, pp. 912 to 917.

A. Tate et al.; Environmentally Sound Handling of Deactivated SCR Catalyst; Downloaded from the Internet on May 13, 2009 at http://www.coalpowermag.com/environmental/136.html.

\* cited by examiner

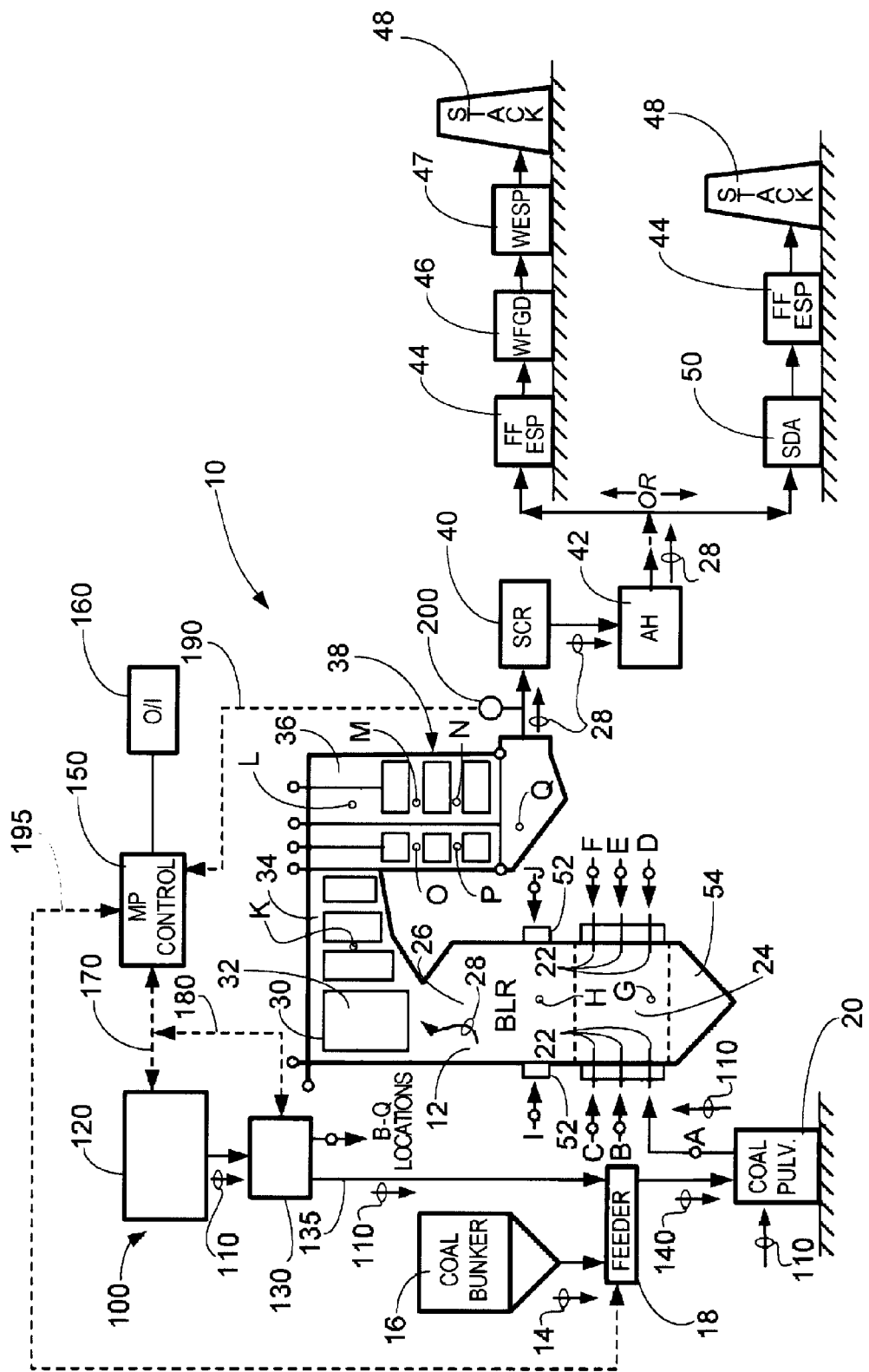

SYSTEM AND METHOD FOR PROTECTION OF SCR CATALYST AND CONTROL OF MULTIPLE EMISSIONS

FIELD AND BACKGROUND OF THE INVENTION

1. Field of the Invention

The present invention relates generally to the field of emission control equipment for boilers, heaters, kilns, or other flue gas-, or combustion gas-, generating devices (e.g., those located at power plants, processing plants, etc.) and, in particular to a new and useful method and apparatus for reducing or preventing the poisoning and/or contamination of an SCR catalyst. In another embodiment, the method and apparatus of the present invention is designed to protect the SCR catalyst.

2. Description of the Related Art $NO_x$ refers to the cumulative emissions of nitric oxide (NO), nitrogen dioxide ($NO_2$) and trace quantities of other nitrogen oxide species generated during combustion. Combustion of any fossil fuel generates some level of $NO_x$ due to high temperatures and the availability of oxygen and nitrogen from both the air and fuel. $NO_x$ emissions may be controlled using low $NO_x$ combustion technology and post-combustion techniques. One such post-combustion technique involves selective catalytic reduction (SCR) systems in which a catalyst facilitates a chemical reaction between $NO_x$ and a reagent (usually ammonia) to produce molecular nitrogen and water vapor.

SCR technology is used worldwide to control $NO_x$ emissions from combustion sources. This technology has been used widely in Japan for $NO_x$ control from utility boilers since the late 1970's, in Germany since the late 1980's, and in the US since the 1990's. Industrial scale SCRs have been designed to operate principally in the temperature range of 500° F. to 900° F., but most often in the range of 550° F. to 750° F. SCRs are typically designed to meet a specified $NO_x$ reduction efficiency at a maximum allowable ammonia slip. Ammonia slip is the concentration, expressed in parts per million by volume, of unreacted ammonia exiting the SCR.

For additional details concerning $NO_x$ removal technologies used in the industrial and power generation industries, the reader is referred to *Steam/its generation and use*, 41$^{st}$ Edition, Kitto and Stultz, Eds., Copyright 2005, The Babcock & Wilcox Company, Barberton, Ohio, U.S.A., particularly Chapter 34—Nitrogen Oxides Control, the text of which is hereby incorporated by reference as though fully set forth herein.

Regulations issued by the EPA promise to increase the portion of utility boilers equipped with SCRs. SCRs are generally designed for a maximum efficiency of about 90%. This limit is not set by any theoretical limits on the capability of SCRs to achieve higher levels of $NO_x$ destruction. Rather, it is a practical limit set to prevent excessive levels of ammonia slip. This problem is explained as follows.

In an SCR, ammonia reacts with $NO_x$ according to one or more of the following stoichiometric reactions (a) to (d):

$$4NO + 4NH_3 + O_2 \rightarrow 4N_2 + 6H_2O \quad (a)$$

$$12NO_2 + 12NH_3 \rightarrow 12N_2 + 18H_2O + 3O_2 \quad (b)$$

$$2NO_2 + 4NH_3 \rightarrow O_2 + 3N_2 + 6H_2O \quad (c)$$

$$NO + NO_2 + 2NH_3 \rightarrow 2N_2 + 3H_2O \quad (d)$$

The above catalysis reactions occur using a suitable catalyst. Suitable catalysts are discussed in, for example, U.S. Pat. Nos. 5,540,897; 5,567,394; and 5,585,081 to Chu et al., all of which are hereby incorporated by reference as though fully set forth herein. Catalyst formulations generally fall into one of three categories: base metal, zeolite and precious metal.

Base metal catalysts use titanium oxide with small amounts of vanadium, molybdenum, tungsten or a combination of several other active chemical agents. The base metal catalysts are selective and operate in the specified temperature range. The major drawback of the base metal catalyst is its potential to oxidize $SO_2$ to $SO_3$; the degree of oxidation varies based on catalyst chemical formulation. The quantities of $SO_3$ which are formed can react with the ammonia carryover to form various ammonium-sulfate salts.

Zeolite catalysts are aluminosilicate materials which function similarly to base metal catalysts. One potential advantage of zeolite catalysts is their higher operating temperature of about 970° F. (521° C.). These catalysts can also oxidize $SO_2$ to $SO_3$ and must be carefully matched to the flue gas conditions.

Precious metal catalysts are generally manufactured from platinum and rhodium. Precious metal catalysts also require careful consideration of flue gas constituents and operating temperatures. While effective in reducing $NO_x$, these catalysts can also act as oxidizing catalysts, converting CO to $CO_2$ under proper temperature conditions. However, $SO_2$ oxidation to $SO_3$ and high material costs often make precious metal catalysts less attractive.

As is known to those of skill in the art, various SCR catalysts undergo poisoning when they become contaminated by various compounds including, but not limited to, certain phosphorus compounds such as phosphorous oxide (PO) or phosphorous pentoxide ($P_2O_5$). Additionally, certain compounds that contain potassium (K), sodium (Na) and phosphorous (P) that are found in, or generated by, various coal-based fuels are known to cause rapid deactivation of SCR catalyst in full-scale units and also in slip-stream units. In these fuels, potassium and sodium are mainly in the form of organically bonded inorganics, or water soluble salts, (see, e.g., Steenari et al.; *Energy and Fuels*; Vol. 18 (2004) 6, pp. 1870 to 1876). This form of association in the fuel makes it very easy for potassium and sodium to vaporize during combustion. Phosphorus can also be contained in the fuel where it is organically bonded (as in the case in biomass) or inorganically bonded (as is the case in Powder River Basin (PRB) coal). Phosphorus is released in the gas phase due to carbothermic reduction reaction happening during char combustion as follows:

$$P_2O_5(\text{solid phase compounds}) + 3C(s) \rightarrow 2PO(g) + 3CO(g)$$

(see, e.g., Hino, et. al.; *ISIJ International*, Vol. 48 (2008)7, pp. 912 to 917). Of particular concern with biomass, phosphorus is released in the gas phase as a result of the combustion process itself irrespective of whether the combustion is staged or un-staged since phosphorus is organically associated with/in the fuel.

More particularly, as the SCR catalysts are exposed to the dust laden flue gas there are numerous mechanisms including blinding, masking and poisoning that deactivates the catalyst and causes a decrease in the catalyst's performance over time. The most common catalyst poison encountered when burning eastern domestic coal (i.e., coal mined in the eastern United States) is arsenic. The most common catalyst poison encountered when burning western domestic coal (i.e., coal mined in the western United States) is phosphorus and calcium sulfate is the most common masking mechanism. The most common catalyst poisons encountered when burning biomass are typically potassium and sodium, or potassium- and sodium-containing compounds. One method of recycling the used catalyst is the process called regeneration washing or rejuvenation. The initial steps of the regeneration process involve the removal of these toxic chemicals by processing the catalysts through various chemical baths in which the poisons are soluble. While this treatment process does an excellent job of removing the desired poisons it produces wastewater with very high arsenic concentrations.

Furthermore, as is known to those of skill in the art, selective catalyst reduction (SCR) technology is used worldwide to control $NO_x$ emissions from combustion sources at high temperatures (550° F. to 750° F.). High temperature SCR technology has been used in Japan for $NO_x$ control from utility boilers since the late 1970s, in Germany since the late 1980's, in US since the 1990's and in China since 2000. The function of the SCR system is to react $NO_x$ with ammonia ($NH_3$) and oxygen to form molecular nitrogen and water. Due to anticipated requirements for lower $NO_x$ emission limits there is a growing need to control $NO_x$ emissions from lignite fired coal power plants in the US and Canada. Some lignite fired units are already in the process of retrofitting SCR to control $NO_x$. Other units will have to follow suit in the near future. There is also an increasing trend to co-combust coal and biomass on existing units with or without SCR. Some older units are completely switching from pulverized coal firing to pulverized biomass combustion. These units even with biomass alone or with coal and biomass co-combustion will have to comply with strict $NO_x$ emissions. The most effective method of complying with low $NO_x$ emission requirements is by SCR technology. The main issue with SCR performance on these units is the deactivation of the catalyst. Both lignite and biomass fuels have potassium, sodium and phosphorous and/or various potassium, sodium and phosphorous compounds which are known catalyst poisons. These poisons attack the catalyst resulting in deactivation of the catalyst over a period of time, thereby shortening the catalyst's active life cycle. As a result of the deactivation, the catalyst cannot function to carry out $NO_x$ reduction as effectively for a longer period of time. Given this, the deactivation reduces the effective life cycle of a catalyst and as a result more frequent catalyst changes are needed for $NO_x$ compliance. Although, there are some catalyst vendors that claim resistance to arsenic poisoning of their catalysts via the use of molybdenum in the catalyst formulation, to date no catalyst have been brought to market that resist poisoning by various potassium, sodium and phosphorous compounds, their elemental species, or their ionic species.

Additionally, beyond controlling $NO_x$ emissions, other emission controls must be considered and/or met in order to comply with various state, EPA and/or Clean Air Act regulations. Some other emission controls which need to be considered for boilers, heaters, kilns, or other flue gas-, or combustion gas-, generating devices (e.g., those located at power plants, processing plants, etc.) include, but are not limited to, mercury, $SO_x$, and certain particulates.

Given the above, a need exists for a method that provides for an economical and environmentally suitable method and/or system to remove the gaseous potassium, sodium and phosphorous compounds, their elemental species, or their ionic species from a combustion process prior to any phosphorus compounds poisoning a catalyst in an SCR.

SUMMARY OF THE INVENTION

The present invention relates generally to the field of emission control equipment for boilers, heaters, kilns, or other flue gas-, or combustion gas-, generating devices (e.g., those located at power plants, processing plants, etc.) and, in particular to a new and useful method and apparatus for reducing or preventing the poisoning and/or contamination of an SCR catalyst. In another embodiment, the method and apparatus of the present invention is designed to protect an SCR catalyst.

Accordingly, one aspect of the present invention is drawn to a method for increasing the active life of an SCR catalyst, the method comprising the steps of: (a) providing at least one kaolin-bearing compound to a combustion zone or flue gas stream of a furnace, or boiler, prior to entry of the flue gas into an SCR; and (b) permitting the at least one kaolin-bearing compound to react with any gaseous potassium and/or sodium compounds, or potassium- and/or sodium-containing compounds present in the combustion zone or flue gas prior to the entry of the flue gas into the SCR.

In yet another aspect of the present invention, there is provided a method for increasing the active life of an SCR catalyst, the method comprising the steps of: (i) providing at least one kaolin-bearing compound to a combustion zone of a furnace or boiler; and (ii) permitting the at least one kaolin-bearing compound to react with any gaseous potassium and/or sodium compounds, or potassium- and/or sodium-containing compounds present in the combustion zone prior to the entry of the flue gas into an SCR, wherein the kaolin-bearing compound is selected from one or more kaolin-containing clays, kaolinite-containing clays, kaolinite, or mixtures of two or more thereof.

In yet another aspect of the present invention, there is provided a method for sequestering one or more potassium and/or sodium compounds, or potassium- and/or sodium-containing compounds, in the form of one or more less reactive sodium aluminosilicate-containing, or potassium aluminosilicate-containing, compounds, the method comprising the steps of: (A) providing at least one kaolin-bearing compound to a combustion zone or flue gas stream of a furnace, or boiler; and (B) permitting the at least one kaolin-bearing compound to react with any potassium and/or sodium compounds, or potassium- and/or sodium-containing compounds present in the combustion zone or flue gas to form one or more less reactive sodium aluminosilicate or potassium aluminosilicate compounds.

In yet another aspect of the present invention, there is provided a method for increasing the active life of an SCR catalyst while concurrently controlling mercury in a gas, the method comprising the steps of: (I) providing at least one kaolin-bearing compound to a combustion zone or flue gas stream of a furnace, or boiler, prior to entry of the flue gas into an SCR; (II) providing at least one iron-bearing halide compound to a combustion zone or flue gas stream of a furnace, or boiler, prior to entry of the flue gas into an SCR; (III) permitting the kaolin portion of the at least one kaolin-bearing compound to react with any gaseous potassium and/or sodium compounds, or potassium- and/or sodium-containing compounds present in the combustion zone or flue gas prior to the entry of the flue gas into the SCR; (IV) permitting the iron portion of the at least one iron-bearing halide compound to react with any gaseous phosphorus compounds, or phosphorus-containing compounds present in the combustion zone or flue gas prior to the entry of the flue gas into the SCR; and (V) permitting the halide portion of the at least one iron-bearing halide compound to react with any gaseous mercury compounds, or mercury-containing compounds, present in the combustion zone or flue gas.

In yet another aspect of the present invention, there is provided a method for sequestering one or more potassium and/or sodium compounds, or potassium- and/or sodium-containing compounds, in the form of one or more less reactive sodium aluminosilicate-containing, or potassium aluminosilicate-containing, compounds, as well as sequestering one or more phosphorus compounds, or phosphorus-containing compounds, in the form of one or more less reactive iron-phosphorus-containing compounds while concurrently sequestering mercury, the method comprising the steps of: (1) providing at least one kaolin-bearing compound to a combustion zone or flue gas stream of a furnace, or boiler; (2) providing at least one iron-bearing halide compound to a combustion zone or flue gas stream of a furnace, or boiler; (3) permitting the kaolin portion of the at least one kaolin-bearing compound to react with any gaseous potassium and/or sodium compounds, or potassium- and/or sodium-containing compounds present in the combustion zone or flue gas to form one or more less reactive sodium aluminosilicate-containing, or potassium aluminosilicate-containing, compounds; (4) permitting the iron portion of the at least one iron-bearing halide compound to react with any gaseous phosphorus compounds, or phosphorus-containing compounds, present in the combustion zone or flue gas to form one or more less reactive iron-phosphorus-containing compounds; and (5) permitting the halide portion of the at least one iron-bearing halide compound to react with any gaseous mercury compounds, or mercury-containing compounds, present in the combustion zone or flue gas.

The various features of novelty which characterize the invention are pointed out with particularity in the claims annexed to and forming a part of this disclosure. For a better understanding of the invention, its operating advantages and specific benefits attained by its uses, reference is made to the accompanying drawings and descriptive matter in which exemplary embodiments of the invention are illustrated.

BRIEF DESCRIPTION OF THE DRAWINGS

The sole FIGURE is a schematic representation of a typical fossil fuel burning facility with an SCR system, and which includes a system for practicing the methods of the present invention.

DESCRIPTION OF THE INVENTION

While the present invention will be described in terms of SCR systems which use ammonia as the $NO_x$ reducing agent, since ammonia is frequently preferred for economic reasons, the present invention is not limited to ammonia based systems. The concepts of the present invention can be used in any system which uses an ammoniacal compound. As used in the present disclosure, an ammoniacal compound is a term meant to include compounds such as urea, ammonium sulfate, cyanuric acid, and organic amines as well as ammonia ($NH_3$). These compounds could be used as reducing agents in addition to ammonia, but as mentioned above, ammonia is frequently preferred for economic reasons. Some non-ammoniacal compounds such as carbon monoxide or methane can be used as well, but with loss in effectiveness.

As used herein, the terms "-bearing compound(s)" and "-containing compound(s)" are used interchangeably. For example, the terms "kaolin-bearing compound" and "kaolin-containing compound" are to be construed as the same and as noted above are utilized interchangeably. As would be apparent, this distinction applies equally to all terms that utilize the same constructs noted herein. Additionally, as used herein, the term "gas phase" includes and/or encompasses both a compound, or compounds, in a gaseous state as well as the same compound, or compounds, in an aerosol state. Also, as used herein, the term "species" includes both a compound and/or an element in an ionic form/state as well as a compound and/or an element in a atomic form/state.

Although the present invention is described in relation to a boiler, or a fossil fuel boiler, it is not limited solely thereto. Instead, the present invention can be applied to any combustion source that generates $NO_x$ regardless of whether such a combustion source is utilized in conjunction with a boiler, or a steam generator. For example, the present invention could be used in combination with a kiln, a heater, or any other type of combustion process that generates, in whole or in part, a flue gas or combustion gas containing $NO_x$. Accordingly, the description below is to be construed as merely exemplary.

As illustrated in the FIGURE, the present invention may be applied to a boiler installation which employs a wet flue gas desulfurization (WFGD or wet scrubber) for removal of sulfur oxides from the flue gases, as shown in the upper right-hand side of the FIGURE. In this configuration, the wet scrubber is typically preceded (with respect to a direction of flue gas flow through the system) by a particulate collection device (PCD), advantageously a fabric filter (FF) bag house, or an electrostatic precipitator (ESP). If desired, there may also be provided a wet electrostatic precipitator (wet ESP or WESP) which may be provided as a final "polishing" stage for fine particulate or $SO_3$. Alternatively, the present invention may be applied to a system which employs a spray dryer apparatus (SDA) or dry scrubber for removal of sulfur oxides from the flue gases, as shown in the lower right-hand side of the FIGURE. In this configuration, the SDA or dry scrubber is typically followed (with respect to a direction of flue gas flow through the system) by a particulate collection device (PCD), advantageously a fabric filter (FF) or baghouse, an electrostatic precipitator (ESP) or even a wet electrostatic precipitator (wet ESP).

Additionally, the present invention can be applied to any SCR catalyst that is adversely affected by poisoning with a phosphorus-based compound such as, but not limited to, $H_3PO_4$, PO or $P_2O_5$, potassium-based compounds such as, but not limited to, potassium chloride (KCl) and/or potassium sulfate ($K_2SO_4$), and/or sodium-based compounds such as, but not limited to, sodium chloride (NaCl) and/or sodium sulfate ($Na_2SO_4$). As such, the present invention is not limited to any one type of SCR catalyst, but rather is broadly applicable to a wide range of SCR catalyst systems. Suitable catalyst systems for which the present invention is applicable include, but are not limited to, honeycomb, plate or corrugated type configurations.

In one embodiment, the present invention is directed to reducing the rate of SCR catalyst deactivation on Powder River Basin (PRB) coal combustion units. It should be noted that although the present invention is described in relation to PRB coal, the present invention is not limited thereto. Rather, the present invention is broadly applicable to any situation where an SCR catalyst is poisoned by one or more gaseous phosphorus compounds, one or more gaseous potassium compounds, one or more gaseous sodium compounds, and/or any combination of two or more of such compounds.

In one embodiment, phosphorous in PRB coal is suspected to cause rapid deactivation in staged combustion and other units. This deactivation is suspected to be caused by gas phase phosphorus released via carbothermic reduction reaction. In this reaction under oxygen deficient conditions, phosphorus-bearing compounds release gas phase phosphorus by the following reaction:

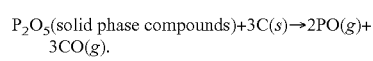

This gas phase phosphorous attaches to the active sites within the catalyst causing the deactivation of the sites for $NO_x$ reduction. As a result of this deactivation the SCR catalyst cannot carry out the $NO_x$ reduction process to the same performance level as unused catalyst.

In another embodiment, potassium, sodium, potassium-containing compounds, and/or sodium-containing compounds in PRB coal and/or biomass is/are suspected to cause rapid deactivation in staged combustion and other units. While not wishing to be bound to any one theory, this deactivation is suspected to be caused by gas phase potassium and/or sodium released via the combustion process due to presence of various potassium and/or sodium compounds in the coal and/or biomass. In this situation, the release of such alkali metal ions and/or atoms occurs due to the temperatures utilized to conduct combustion of the coal and/or biomass and the subsequent vaporization and/or dissociation of the aforementioned potassium and/or sodium compounds.

This gas phase potassium and/or sodium ions and/or atoms attach to the active sites within the catalyst causing the deactivation of such sites for $NO_x$ reduction. As a result of this deactivation, the SCR catalyst cannot carry out the $NO_x$ reduction process to the same performance level as unused and/or "fresh" catalyst.

In one embodiment, the present invention relates to a system and method to prevent formation of gas phase potassium, sodium and/or phosphorus species in the combustion environment thus reducing, mitigating and/or eliminating the rate of SCR deactivation. In one embodiment, the present invention accomplishes the aforementioned goal by the addition of at least one kaolin-bearing compound, at least iron-bearing compound, or any suitable combination thereof to the PRB coal prior to combustion.

In one embodiment, the kaolin-bearing compound(s) of the present invention is/are any kaolin-containing compound (e.g., kaolinite which is a mineral that is contained in kaolin clays and which has a chemical composition of $Al_2Si_2O_5(OH)_4$). Accordingly, as used herein, "kaolin" is defined to mean, and encompass, any clay that contains a sufficient amount of kaolin therein (e.g., any clay that is at least 25 weight percent kaolin), or any clay or other compound that contains a sufficient amount of the mineral kaolinite ($Al_2Si_2O_5(OH)_4$) (e.g., any clay, or other compound, that is at least 25 weight percent kaolinite). In another embodiment, the amount of kaolin in kaolin-containing compound is at least about 30 weight percent, at least about 40 weight percent, at least about 50 weight percent, at least about 60 weight percent, at least about 70 weight percent, at least about 75 weight percent, at least about 80 weight percent, at least about 90 weight percent, or even at least about 95 weight percent. In still another embodiment, any kaolin-containing compound regardless of kaolin content can be utilized in conjunction with the present invention so long as the kaolin content thereof is at least about 10 weight percent. Here, as well as elsewhere in the specification and claims, individual range values can be combined to form additional and/or non-disclosed ranges. While not wishing to be bound to any one theory, it is believed that the aluminosilicate portion of the kaolin reacts with "free" potassium and/or sodium ions that are generated due to the combustion of coal and/or biomass that contains various potassium, sodium and/or phosphorous compounds to generate potassium and/or sodium aluminosilicate compounds (e.g., $NaAlSi_3O_8$ and $KAlSi_3O_8$). This in turn permits the sequestration of the potassium and/or sodium ions and/or atoms that would otherwise be "free" to poison the SCR catalyst.

Regarding any phosphorous compounds that are contained in the combustion gases, such compounds are sequestered via the inclusion of one or more iron-bearing compounds in combination with a kaolin-bearing compound as defined above. Thus, in one embodiment, the present invention enables the sequestration of multiple species selected from potassium, sodium, phosphorus and any combination thereof.

In one embodiment, the iron-bearing compound(s) of the present invention is/are any iron compound (e.g., an iron oxide compound) that is/are able to undergo reduction in the combustion environments common to boilers, furnaces, power plants, etc. In one particular embodiment, the iron-bearing compound is iron (III) oxide ($Fe_2O_3$), also known as red iron oxide or hematite. In the embodiment where iron (III) oxide is utilized the reactions of interest that occur in the combustion portion of a boiler or furnace are as shown below:

$$3Fe_2O_3(s) + CO(g) \rightarrow 2Fe_3O_4(s) + CO_2(g) \qquad (1)$$

$$Fe_3O_4(s) + CO(g) \rightarrow 3FeO(s) + CO_2(g) \qquad (2).$$

It should be noted that the $Fe_3O_4$, also known as black iron oxide or magnetite, of the first reaction above can also be written more accurately as $FeO \cdot Fe_2O_3$. The FeO or iron (II) oxide, also known as ferrous oxide, which is generated due to the reduction of $Fe_2O_3$ is then available to tie-up, bind and/or sequester any PO gas present in the combustion zone, or the flue gas, of a boiler, or furnace, prior to arrival at the SCR. This PO gas will then form Fe—P and/or Fe—P—O compounds in particulate phase prior to arrival at the SCR. The particulate will pass through the catalyst and avoid the catalyst deterioration.

In another embodiment, the present invention can utilize iron (II) carbonate which is converted to the desired iron (II) oxide in the combustion zone via the reaction shown below:

$$FeCO_3(s) \rightarrow FeO(s) + CO_2(g) \qquad (3).$$

In still another embodiment, the present invention can utilize one or more iron halides. Suitable iron halides include, but are not limited to, iron (II) bromide, iron (III) bromide, iron (II) chloride, iron (III) chloride, iron (II) iodide, iron (III) iodate ($Fe(IO_3)_3$), or any mixture of two or more thereof. In still another embodiment, any one or more iron halides can be used in combination with another non-halide containing iron compound (e.g., iron (II) carbonate). In still another embodiment, the present invention utilizes a combination of iron (II) bromide and/or iron (III) bromide with iron (II) carbonate to control the amount of phosphorous in a flue gas, or combustion gas while concurrently permitting the control of mercury compounds, or mercury-containing compounds, in a flue gas, or combustion gas. As used herein, mercury compounds, or mercury-containing compounds, include, but are not limited to, any compound that contains either oxidized mercury, or bound elemental mercury. In still another embodiment, the present invention is directed to concurrently permitting the control of mercury compounds, or mercury-containing compounds, that contain primarily, or only, oxidized mercury. As used herein any iron compound, halide or otherwise, can be utilized in a hydrated or non hydrated form. As such, reference to any iron compound herein by definition includes any hydrated forms that exist whether or not specifically mentioned by chemical formula.

As is known in the art, (see, e.g., United States Patent Application Publication No. 2008/0107579 Downs et al. the text of which is hereby incorporated by reference as though fully set forth herein) halide-containing compounds are utilized to oxidize elemental mercury present in a flue, or combustion, gas. Due to this oxidation reaction, the halide portion of a suitable halide-containing compound permits elemental mercury to be converted into a more favorable form for subsequent capture, or sequestration, via one or more suitable environmental control technologies (e.g., a wet scrubber or spray dry absorber (SDA), a flue gas desulfurization system (FGD), a powdered activated carbon system (PAC), or a particulate collecting system such as a fabric filter (FF) or a electrostatic precipitator (ESP)). In one instance, as is known in the art, the addition of one or more suitable halide-containing compounds also increases the amount of mercury that is particulate-bound. Given that numerous patents and published applications detail the manner by which suitable halide-containing compounds permit the increased recovery of mercury from a flue, or combustion, gas, a detailed discussion hereof is omitted for the sake of brevity.

As such, in still another embodiment, the present invention encompasses utilizing at least one kaolin-bearing compound in conjunction with at least one iron halide compound in order to achieve a multi-faceted control of various gas phase potassium, sodium, phosphorus and mercury compounds, ions and/or atoms, as discussed above.

In any of the above embodiments, one or more suitable kaolin-bearing compounds, one or more suitable iron-bearing compounds, one or more suitable iron halide compounds, or any mixture thereof can be added to the coal in the pulverizer. In still another embodiment, one or more suitable kaolin-bearing compounds, one or more suitable iron-bearing compounds, one or more suitable iron halide compounds, or any mixture thereof of the present invention can be added to the combustion zone of a boiler and/or furnace via a suitable supply line designed to deliver one or more powderized compounds to the combustion zone of a furnace and/or boiler. To this end, the FIGURE illustrates several embodiments of suitable design schemes for accomplishing this result.

Referring to the FIGURE, there is illustrated a schematic representation of a typical fossil fuel burning facility, generally designated 10, with an SCR system, and which includes a system for practicing the methods of the present invention. As shown, boiler 12 is provided for extracting the heat from the combustion of a fossil fuel, such as coal, through combustion with an oxidant, typically air. The heat is transferred to a working fluid, such as water, to generate steam used to either generate power via expansion through a turbine generator apparatus (not shown) or for industrial processes and/or heating.

The raw coal 14 must be crushed to a desired fineness and dried to facilitate combustion. Raw coal 14 is temporarily stored in a coal bunker 16 and then transferred by means of a gravimetric or volumetric feeder 18 to one or more coal pulverizers 20. In the embodiment shown in the FIGURE, there are six (6) coal pulverizers, identified as coal pulverizers A-F. As is known to those skilled in the art, each coal pulverizer 20 grinds the coal to a desired fineness (e.g., 70% through 200 mesh) and as it is ground, hot primary air from primary air fans (not shown) is conveyed into each coal pulverizer 20 to preheat and remove moisture from the coal to desired levels as it is ground. The primary air is also used to convey the pulverized coal (PC) out of each coal pulverizer 20 and delivers it along a plurality of pulverized coal supply lines (one such burner line is identified at A in the FIGURE; a single coal pulverizer 20 may supply coal through 4-8 pulverized coal supply lines) to the burners 22 on the front and rear walls of the boiler 12. Typically, the burners 22 are located in spaced elevations on one or both of the opposed front and rear walls of the boiler 12, or at the corners of the boiler in installations known as corner-fired or tangentially-fired units (not shown). The present invention can be utilized in conjunction with, but is not limited solely to, single-wall fired, opposed-wall fired and corner- or tangentially-fired units. Typically, a single coal pulverizer 20 only provides coal to a single elevation of burners 22 on a wall. Thus, in the embodiment shown in the FIGURE, the six coal pulverizers A-F supply corresponding burner elevations A-F. However, as is known to those skilled in the art, other pulverizer and burner configurations are known (e.g., single pulverizers supplying burners on multiple walls and/or elevations or multiple pulverizers supplying burners on a single elevation) and the present invention applies to any such configurations.

The combustion process begins in the burner zone 24 of the boiler 12's furnace 26, releasing heat and creating hot flue gas 28 which is conveyed upwardly to the upper portion 30 of the boiler 12, across heating surfaces schematically indicated as rectangles 32. The flue gas 28 is then conveyed across the heating surfaces in the pendant convection pass 34, into the upper portion 36 of the horizontal convection pass 38. The flue gas 28 is then conveyed through a selective catalytic reduction (SCR) apparatus 40 where $NO_x$ in the flue gas is reduced, and then through primary and secondary air heater devices schematically indicated at 42. The air heaters 42 extract additional heat from the flue gas 28, lowering the temperature of the flue gas, and preheat the incoming air used for combustion.

As illustrated in the FIGURE, and downstream of the air heaters 42, the flue gas 28 undergoes further treatment for the removal of particulates and sulfur oxides. Two typical configurations of the downstream equipment employed to accomplish these tasks are shown on the right-hand side of the FIGURE. The upper equipment configuration in the FIGURE comprises a particulate collection device (PCD) schematically indicated at 44, for removal of particulates from the flue gas 28, and which may comprise in practice a fabric filter or an electrostatic precipitator. Downstream of the PCD 44 there is provided a wet flue gas desulfurization (WFGD) device, also known as a wet scrubber, for removal of sulfur oxides from the flue gas 28. The cleaned, scrubbed flue gas may (optionally) be conveyed through a wet ESP 47 for removal of fine particulate or $SO_3$, and then conveyed to stack 48 for discharge to the atmosphere.

The lower equipment configuration in the FIGURE comprises a spray dryer apparatus (SDA) schematically indicated at 50, also known as a dry scrubber, for removal of sulfur oxides from the flue gas 28. Downstream of the SDA 50 there is provided a particulate collection device (PCD) 44, as described above, for removal of particulates from the flue gas 28. The cleaned, scrubbed flue gas is then conveyed to stack 48 for discharge to the atmosphere.

In order to further reduce $NO_x$ emissions, some boilers 12 employ staged combustion wherein only part of the stoichiometric amount of air is provided in the main burner zone 24, with the balance of the air for combustion, together with any excess air required due to the fact that no combustion process is 100 percent efficient, is provided above the burner zone 24 via over fire air (OFA) ports 52. If staged combustion is employed in a boiler 12, due to the reduced air supplied to the burner zone 24, a reducing atmosphere is created in the lower portion of the furnace 26, including the hopper region 54.

In accordance with a first embodiment of the present invention, one or more suitable kaolin-bearing compounds, one or more suitable iron-bearing compounds, one or more suitable iron halide compounds, or any mixture thereof is/are added to the one or more coal pulverizers 20 prior to supplying the pulverized coal to the one or more burners 22. The system and apparatus for accomplishing this desired result is also shown in the FIGURE, generally designated 100. The system 100 comprises a storage means 120 for temporarily storing the potassium, sodium, phosphorous and/or mercury reduction/sequestration compound, generally designated 110; delivery means 130, 135 for conveying the compound(s) 110 to a desired location, including valves, seals, etc. as required; and control means 150, advantageously microprocessor-based control means, which are accessed via an operator via human operator interface (I/O) station 160, which includes display and data collection and storage means as required. In the FIGURE, the raw coal 14 to which compound(s) 110 has/have been added is referred to as 140. Advantageously, compound(s) 110 may be provided along with the raw coal 14 via the feeder 18, which permits close control and measurement of the delivery of both raw coal 14 and compound(s) 110 into the coal pulverizer 20. Alternatively, compound(s) 110 may be provided directly into the coal pulverizer 20 and/or directly into one or more individual burner lines A-F providing the pulverized coal to individual burners 22, with suitable sealing devices against the positive pressure within the coal pulverizer 20 or burner lines A-F. The delivery means may be slurry-based or pneumatic as required by the particulars of compound(s) 110 and the amount and location of introduction into the flue gas 28. An interconnected arrangement of control or signal lines 170, 180, 190 and 195 interconnect these various devices to provide control signals, compound(s) 110 level signals, and potassium, sodium, phosphorous and/or mercury level signals in the flue gas 28 (from a sensor 200) to permit the introduction of the potassium, sodium, phosphorous and/or mercury reducing/sequestration compound(s) 110 into the flue gas 28 to be controlled by a human operator, or automatically controlled. However, if a suitable, real-time sensor 200 for measuring levels of gaseous potassium, sodium, phosphorous and/or mercury in the flue gas 28 is/are not available, flue gas samples may instead be taken at the location 200 for later laboratory analysis via suitable test methods, which may be inductively coupled plasma-mass spectrometry (ICP-MS). Based upon the laboratory results, a human operator could then use the operator interface 160 to manually input a desired set-point into control means 150 for the amount of potassium, sodium, phosphorous and/or mercury reducing/sequestration compounds 110 introduced into the flue gas 28. Provided that subsequent laboratory analyses do not indicate any significant variation in gaseous potassium, sodium, phosphorous and/or mercury levels in the flue gas 28, there may be no need for real-time, close control of the introduction of potassium, sodium, phosphorous and/or mercury reducing/sequestration compound(s) 110. Instead, the amount of potassium, sodium, phosphorous and/or mercury reducing/sequestration compound(s) 110 introduced into the flue gas 28 may be simply a function of boiler load or coal feed rate values.

In still yet another embodiment, the present invention utilizes at least one kaolin-bearing compound in combination with iron (II) oxide. In this embodiment, the need for a reduction reaction to occur is eliminated and the addition points for the iron (II) oxide of this embodiment are therefore broader then previous embodiments. In this case, the kaolin-bearing compound and the iron (II) oxide can be added at any suitable point post-combustion and pre-SCR in order to capture, reduce, tie-up, bind and/or sequester any "free" gaseous potassium, sodium, phosphorus and/or mercury compounds, ions, and/or atoms present in the flue gas of a boiler, or furnace, prior to arrival at the SCR. In particular, the phosphorous reduction compound can be supplied at one or more of the locations G through Q shown in the FIGURE. More particularly, the potassium, sodium, phosphorous and/or mercury reducing/sequestration compound(s) can also be provided (e.g., either separately, independently, or in any combination) into the flue gas 28 at one or more of the following locations:

G: into or below the burner zone 24, in one or more of the front, rear or side walls, via means separate from the burners 22;
H: into the furnace 26 at a location above the burner zone 24, in one or more of the front, rear or side walls;
I, J: into the furnace 26 in the vicinity of or via the OFA ports 52 on one or both of the front or rear walls;
K: into the boiler 12 in the pendant convection pass 34;
L: into the boiler 12 in the upper portion 36 of the horizontal convection pass 38;
M, N, O, P: into the boiler 12 in the horizontal convection pass 38; and/or
Q: into the boiler 12 in the hopper region below the horizontal convection pass 38.

Given the above, the reduced iron, or iron (II) oxide, of the present invention is able to capture, reduce, tie-up, bind and/or sequester the gas phase phosphorus in the form of iron-phosphorus alloys which upon coming in contact with the over fire air from iron-phosphorus oxide compounds, while the kaolin-bearing compound is able to capture, reduce, tie-up, bind and/or sequester any gas phase potassium and/or sodium compounds. This significantly reduces the amount of gas phase potassium, sodium and/or phosphorus accumulation in an SCR catalyst. Another advantage of the present invention is that through addition of kaolin and/or iron a significant portion of any potassium, sodium and/or phosphorus present will be aluminosilicate-bound and/or iron-bound.

While not wishing to be bound to any one theory, alkali aluminosilicates are believed to be less likely to be in a gas phase state in the conditions commonly found in a combustion process and/or an SCR unit. This enables the minimization of the amount potassium and sodium that is transferred to an SCR catalyst and thus available to poison the SCR catalyst. Additionally, Iron-bound phosphorus compounds are less leachable thereby minimizing the transfer of phosphorus to an SCR catalyst. Furthermore, phosphorus associated with and/or bound to an iron compound (e.g., an iron oxide) is more stable than phosphorus that is associated with and/or bound to a calcium compound (e.g., calcium oxide). Given this, the present invention is, in one embodiment, directed to the situation where a majority of the potassium, sodium and/or phosphorus present in the combustion and/or flue stream is sequestered in a suitable alkali aluminosilicate compound and/or iron-phosphorus-oxygen-containing compound thereby substantially reducing the amount of "free" gaseous potassium-/sodium-containing compounds and/or calcium/phosphorus/oxygen-containing compounds that are able to react with $SO_x$. This in turn substantially reduces the amount of gaseous potassium-/sodium-containing compounds that can poison the SCR catalyst. Furthermore, the amount of gaseous phosphorus that is produced in the combustion and/or flue gas stream is substantially reduced by restricting the amount of calcium/phosphorus/oxygen-containing compounds that are present in the combustion and/or flue gas stream to react with various $SO_x$ compounds resulting in the unwanted production of gaseous phosphorus compounds, or phosphorus/oxygen compounds, that can lead to the undesired poisoning of an SCR catalyst.

In still another embodiment, the one or more kaolin-bearing compounds, and/or one or more iron-bearing compounds of the present invention can be added in any suitable manner, including the manner detailed in the FIGURE. Suitable kaolin-bearing compounds are detailed above. Suitable iron-bearing compounds include, but are not limited to, aqueous and soluble forms of iron-bearing compounds such as iron halides (e.g., iron chlorides, iron bromides, iron iodide, or iron iodate), metallic iron, one or more iron oxides, iron carbonate, or mixtures of two or more thereof. If an existing skid is used then one or more aqueous reagents can be pumped via positive displacement pumps from a storage tank to the one or more coal feeders where the reagent is sprayed on the coal as the coal passes on a feeder belt upstream of the pulverizers.

In one embodiment, the present invention is advantageous in that it is applicable to both existing SCRs (retrofits) and new SCRs. Additionally, the present invention can be applied to plants that utilize biomass as a fuel source. In one embodiment, implementation of the present invention can be accomplished in a cost-effective manner utilizing low cost hardware designed to supply the necessary iron compound to a combustion process. The present invention also does not affect the current design of boilers and SCRs.

In one embodiment, the amount of the one or more kaolin-bearing compounds and/or iron compound, or compounds, utilized in conjunction with the present invention varies depending upon the phosphorus content in the coal to be burned. As is known to those of skill in the art, the potassium, sodium and/or phosphorus content of coal and/or biomass can be determined by various known methods. Thus, in this instance, the present invention is not limited to any one range, or amount, of kaolin-bearing compounds and/or iron-bearing compounds that are supplied/utilized. Instead, a stoichiometric ratio is utilized. In one embodiment, the stoichiometric ratio of potassium and/or sodium to kaolin-bearing compound is in the range of about 1:3 to about 3:1, or from about 1:2 to about 2:1, or from about 1:1.5 to about 1.5:1, or from about 1:1.25 to about 1.25:1, or even about 1:1. In one embodiment, the stoichiometric ratio of iron to phosphorus is in the range of about 1:3 to about 3:1, or from about 1:2 to about 2:1, or from about 1:1.5 to about 1.5:1, or from about 1:1.25 to about 1.25:1, or even about 1:1. Here, as well as elsewhere in the specification and claims, individual range values can be combined to form additional and/or non-disclosed ranges.

In another embodiment, the amount of kaolin-bearing compound, or compounds, and/or iron-bearing compound, or compounds, utilized in conjunction with the present invention is within a given range when the fuel utilized is Powder River Basin/Lignite coal, biomass, or any combination thereof. In this embodiment, the amount of the kaolin-bearing compound, or compounds, and/or iron-bearing compound, or compounds, to Powder River Basin/Lignite coal, biomass, or any combination thereof, is expressed as the amount of kaolin-bearing compound, or compounds, and/or iron-bearing compound, or compounds, (hereinafter referred to as just "kaolin" and/or "iron" in only this instance) in pounds for every 1,000 pounds of coal and/or biomass. In one embodiment, the amount of kaolin and/or iron compound, or compounds, utilized is in the range of about 0.7 pounds of "kaolin" and/or "iron" per 1,000 pounds of coal and/or biomass to about 6 pounds of "kaolin" and/or "iron" per 1,000 pounds of coal and/or biomass. In another embodiment, the amount of kaolin and/or iron compound, or compounds, utilized is in the range of about 1 pound of "kaolin" and/or "iron" per 1,000 pounds of coal and/or biomass to about 5.5 pounds of "kaolin" and/or "iron" per 1,000 pounds of coal and/or biomass, or from about 1.5 pounds of "kaolin" and/or "iron" per 1,000 pounds of coal and/or biomass to about 5 pounds of "kaolin" and/or "iron" per 1,000 pounds of coal and/or biomass, or from about 2 pounds of "kaolin" and/or "iron" per 1,000 pounds of coal and/or biomass to about 4.5 pounds of "kaolin" and/or "iron" per 1,000 pounds of coal and/or biomass, or from about 2.5 pounds of "kaolin" and/or "iron" per 1,000 pounds of coal and/or biomass to about 4 pounds of "kaolin" and/or "iron" per 1,000 pounds of coal and/or biomass, or from about 3 pounds of "kaolin" and/or "iron" per 1,000 pounds of coal and/or biomass to about 3.5 pounds of "kaolin" and/or "iron" per 1,000 pounds of coal and/or biomass. Here, as well as elsewhere in the specification and claims, individual range values can be combined to form additional and/or non-disclosed ranges.

In another embodiment, wherein the iron portion of the present invention that is to be utilized for controlling various compounds in a flue gas, or combustion gas, of a 100 MWe coal and/or biomass power plant is both iron (II) bromide and iron (II) carbonate, the injection rate for the iron (II) carbonate is as discussed above while the iron (II) bromide is supplied as a solution and at an amount in the range of about 0.25 gallons per hour to about 10 gallons per hour, or from about 0.5 gallons per hour to about 5 gallons per hour, or even from about 1 gallon per hour to about 4 gallons per hour. In another embodiment, where just an iron halide is utilized (e.g., iron (II) bromide and/or iron (III) bromide) the amount of iron halide supplied to the flue gas, or combustion gas, is sufficient to yield a concentration of bromide between about 10 ppm to about 200 ppm, or from about 25 ppm to about 175 ppm, or from about 50 ppm to about 150 ppm. It should be noted that depending upon the emissions control technology in place on the device generating the flue gas, or combustion gas, it may be desirable to use a lower bromide concentration in order to prevent any type of detrimental effects to such downstream emissions technology. In one embodiment of such an instance the concentration of bromide is between about 10 ppm to about 125 ppm, or from about 25 ppm to about 100 ppm, or from about 50 ppm to about 75 ppm. Here, as well as elsewhere in the specification and claims, individual range values (even from different embodiments) can be combined to form additional and/or non-disclosed ranges.

In light of the above, one of skill in the art would recognize that the amount of kaolin compounds and/or iron compounds necessary to supply the desired amount of kaolin, iron and/or halogen to a flue gas, or combustion gas, in accordance with the process of the present invention will vary depending upon the size of the device generating such flue gas, or combustion gas. Thus, the present invention is not limited to any specific rate or range of supply.

In another embodiment, for a 100 MWe coal and/or biomass power plant the amount of iron (II) bromide solution (25 weight percent solution) supplied to the flue gas, or combustion gas, is in the range of about 0.25 gallons per hour to about 6 gallons per hour, or from 0.5 gallons per hour to about 5 gallons per hour, or even from 1 gallon per hour to about 4 gallons per hour. Here, as well as elsewhere in the specification and claims, individual range values can be combined to form additional and/or non-disclosed ranges. However, as is noted above, the present invention is not limited to solely these supply rates. Rather, any supply rate can be used in order to achieve the desired concentration of bromide and/or iron. As would be apparent to one of skill in the art, other additional factors can impact the amount of iron-bearing compounds supplied in connection with the various embodiments of the present invention. Such additional factors include, but are not limited to, the amount and/or type of phosphorus present in the coal, or other combustible fuel; the size and/or output of the boiler, heater, kiln, or other flue gas-, or combustion gas-, generating device; and the desired stoichiometric ratio to be achieved; the type and/or manner of combustion, the type and/or arrangement of any applicable equipment or structure.

In another embodiment, the one or more kaolin compounds, and/or one or more iron compounds utilized in conjunction with the present invention can be of any particle size and/or particle geometry. Suitable particle geometries include, but are not limited to, spherical, platelet-like, irregular, elliptical, oblong, or a combination of two or more different particle geometries. In one embodiment, the one or more kaolin compounds, and/or one or more iron compounds of the present invention, if water soluble and/or suspendible, can be supplied in solution and/or suspension form. In such an instance, a solution and/or suspension concentration of at least about 15 weight percent of the one or more water soluble and/or suspendible kaolin compounds and/or iron compounds is/are utilized. In another embodiment, a solution and/or suspension concentration of at least about 20 weight percent, at least about 25 weight percent, at least about 30 weight percent, at least about 35 weight percent, at least about 40 weight percent, at least about 45 weight percent, or even at least about 50 weight percent of more of the one or more water soluble and/or suspendible kaolin compounds and/or iron compounds is utilized is utilized in conjunction with the present invention. Here, as well as elsewhere in the specification and claims, individual range values can be combined to form additional and/or non-disclosed ranges. As would be appreciated by those of skill in the art, the solution and/or suspension concentration of any one or more water soluble and/or suspendible kaolin compounds and/or iron compounds should not, in one embodiment, exceed the solubility amount for the one or more iron compounds.

In still another embodiment, the one or more kaolin compounds and/or iron compounds of the present invention can be supplied in a powdered form, a solution form, an aqueous suspension form, or any combination thereof. In the case of an aqueous suspension, the one or more kaolin compounds and/or iron compounds utilized in conjunction with the present invention should have a suitable particle size. Additionally, even absent the desire to place the one or more kaolin compounds and/or iron compounds of the present invention into an aqueous solution, the one or more kaolin compounds and/or iron compounds should have a suitable particle size that facilitates a higher degree of reactivity when placed into contact with a flue, or combustion, gas. In one embodiment, both of these conditions can be met, whether individually or in combination, by one or more kaolin compounds and/or iron compounds where at least about 95 percent of the particles have a particle size of less than about 400 µm (microns), where at least about 95 percent of the particles have a particle size of less than about 350 µm (microns), where at least about 95 percent of the particles have a particle size of less than about 300 µm (microns), where at least about 95 percent of the particles have a particle size of less than about 250 µm (microns), where at least about 95 percent of the particles have a particle size of less than about 200 µm (microns), or even where at least about 95 percent of the particles have a particle size of less than about 175 µm (microns). Here, as well as elsewhere in the specification and claims, individual range values can be combined to form additional and/or non-disclosed ranges.

Although not limited hereto, when utilized, a suitable iron compound for use in conjunction with the present invention is iron (II) carbonate available from Prince Agri Products (a subsidiary of Phibro Animal Health Corporation located in Ridgefield Park, N.J.). This iron (II) carbonate is a powdered compound where at least about 95% of its particles are less than 200 µm (microns) in size. Additionally, the concentration of iron (II) carbonate in this product is about 80 percent by weight with substantially all of the remaining 20 weight percent being non-reactive in light of the use here.

In the instance where an aqueous suspension is utilized in conjunction with the present invention, such an aqueous suspension can further comprise a suitable amount of one or more anti-settling, suspension, thickening or emulsification agents. Suitable anti-settling, suspension, thickening or emulsification agents include, but are not limited to, sodium polyacrylates, carbomers, acrylates, inorganic thickening agents. Other suitable anti-settling, suspension, thickening or emulsification agents are known to those of skill in the art and as such a discussion herein is omitted for the sake of brevity. In another embodiment, a suitable suspension or emulsification can be achieved via agitation and does not necessarily require the use of one or more anti-settling, suspension, thickening or emulsification agents. In another embodiment, a combination of one or more anti-settling, suspension, thickening or emulsification agents can be utilized in combination with agitation.

In still another embodiment, the one or more kaolin compounds and/or iron compounds of the present invention should have a purity of at least about 50 weight percent, at least about 55 weight percent, at least about 60 weight percent, at least about 65 weight percent, at least about 70 weight percent, at least about 75 weight percent, at least about 80 weight percent, at least about 85 weight percent, at least about 90 weight percent, at least about 95 weight percent, or even at least about 99 weight percent or higher. Here, as well as elsewhere in the specification and claims, individual range values can be combined to form additional and/or non-disclosed ranges.

As for the portion of the one or more kaolin compounds and/or iron compounds that is not either "a kaolin compound" and/or "an iron compound," such impurities should be non-reactive in the environments present in conjunction with the present invention. Alternatively, if reactive, such impurities should either be easily captured, removed and/or sequestered, or should not add significantly to any further contamination of any catalyst downstream. In still another embodiment, the amount of potassium-, sodium- and/or phosphorus-containing compound impurities in any of the one or more kaolin compounds and/or iron compounds that are utilized in conjunction with the present invention should be less than about 5 weight percent, less than about 2.5 weight percent, less than about 1 weight percent, less than about 0.5 weight percent, less than about 0.25 weight percent, less than about 0.1 weight percent, or even less than about 0.01 weight percent. Here, as well as elsewhere in the specification and claims, individual range values can be combined to form additional and/or non-disclosed ranges. In still yet another embodiment, the amount of potassium-, sodium- and/or phosphorus-containing compound impurities in any of the one or more kaolin compounds and/or iron compounds that are utilized in conjunction with the present invention should be zero. That is, in this embodiment the one or more kaolin compounds and/or iron compounds that are utilized in conjunction with the present invention should be free from any potassium-, sodium- and/or phosphorus-containing compounds.

While not wishing to be bound to any one theory, it is believed that the present invention exploits various preferential reactions between potassium, sodium and/or phosphorous compounds, or potassium-, sodium- and/or phosphorus-containing compounds, to sequester various potassium, sodium and/or phosphorous compounds, or potassium-, sodium- and/or phosphorus-containing compounds that are detrimental to an increased active, or service, life of an SCR catalyst. Thus, the reactions discussed herein are to be construed as non-limiting in that other additional reactions may be occurring in the combustion and/or flue gas stream.

While specific embodiments of the present invention have been shown and described in detail to illustrate the application and principles of the invention, it will be understood that it is not intended that the present invention be limited thereto and that the invention may be embodied otherwise without departing from such principles. In some embodiments of the invention, certain features of the invention may sometimes be used to advantage without a corresponding use of the other features. Accordingly, all such changes and embodiments properly fall within the scope of the following claims.

What is claimed is:

1. A method for increasing the active life of an SCR catalyst, the method comprising the steps of:
    (a) providing at least one kaolin-bearing compound to a combustion zone or flue gas stream of a furnace, or boiler, prior to entry of the flue gas into an SCR; and
    (b) permitting the at least one kaolin-bearing compound to react with any gaseous potassium and/or sodium compounds, or potassium- and/or sodium-containing compounds present in the combustion zone or flue gas prior to the entry of the flue gas into the SCR.

2. The method of claim 1, wherein the kaolin-bearing compound is selected from one or more kaolin-containing clays, kaolinite-containing clays, kaolinite, or mixtures of two or more thereof.

3. The method of claim 1, wherein the kaolin-bearing compound is selected from kaolinite.

4. The method of claim 1, wherein the at least one kaolin-bearing compound is provided to the combustion zone via addition to pulverized coal, biomass, or a mixture thereof.

5. The method of claim 1, wherein the at least one kaolin-bearing compound is provided to the combustion zone via a dedicated supply line.

6. The method of claim 1, wherein the method further comprises the steps of:
    (c) providing at least one iron-bearing compound to a combustion zone or flue gas stream of a furnace, or boiler, prior to entry of the flue gas into an SCR; and
    (d) permitting the at least one iron-bearing compound to react with any gaseous phosphorus compounds, or phosphorus-containing compounds, present in the combustion zone or flue gas prior to the entry of the flue gas into the SCR.

7. A method for increasing the active life of an SCR catalyst, the method comprising the steps of:
    (i) providing at least one kaolin-bearing compound to a combustion zone of a furnace or boiler; and
    (ii) permitting the at least one kaolin-bearing compound to react with any gaseous potassium and/or sodium compounds, or potassium- and/or sodium-containing compounds present in the combustion zone prior to the entry of the flue gas into an SCR,
    wherein the kaolin-bearing compound is selected from one or more kaolin-containing clays, kaolinite-containing clays, kaolinite, or mixtures of two or more thereof.

8. The method of claim 7, wherein the at least one kaolin-bearing compound is provided to the combustion zone via addition to pulverized coal, biomass, or a mixture thereof.

9. The method of claim 7, wherein the at least one kaolin-bearing compound is provided to the combustion zone via a dedicated supply line either in aqueous suspension or in a powdered form.

10. The method of claim 7, wherein the method further comprises the steps of:
    (iii) providing at least one iron-bearing compound to a combustion zone of a furnace or boiler; and
    (iv) permitting the at least one iron-bearing compound to react with any gaseous phosphorus compounds, or phosphorus-containing compounds, present in the combustion zone prior to the entry of the flue gas into an SCR.

11. A method for increasing the active life of an SCR catalyst while concurrently controlling mercury in a gas, the method comprising the steps of:
    (I) providing at least one kaolin-bearing compound to a combustion zone or flue gas stream of a furnace, or boiler, prior to entry of the flue gas into an SCR;
    (II) providing at least one iron-bearing halide compound to a combustion zone or flue gas stream of a furnace, or boiler, prior to entry of the flue gas into an SCR;
    (III) permitting the kaolin portion of the at least one kaolin-bearing compound to react with any gaseous potassium and/or sodium compounds, or potassium- and/or sodium-containing compounds present in the combustion zone or flue gas prior to the entry of the flue gas into the SCR;
    (IV) permitting the iron portion of the at least one iron-bearing halide compound to react with any gaseous phosphorus compounds, or phosphorus-containing compounds present in the combustion zone or flue gas prior to the entry of the flue gas into the SCR; and
    (V) permitting the halide portion of the at least one iron-bearing halide compound to react with any gaseous mercury compounds, or mercury-containing compounds, present in the combustion zone or flue gas.

12. The method of claim 11, wherein the kaolin-bearing compound is selected from one or more kaolin-containing clays, kaolinite-containing clays, kaolinite, or mixtures of two or more thereof.

13. The method of claim 11, wherein the kaolin-bearing compound is selected from kaolinite.

14. The method of claim 11, wherein the iron-bearing halide compound is selected from iron (II) bromide, iron (III) bromide, iron (II) chloride, iron (III) chloride, iron (II) iodide, iron (III) iodate, or mixtures of two or more thereof.

15. The method of claim 11, wherein the iron-bearing halide compound is iron (II) bromide.

16. The method of claim 11, further comprising supplying one or more non-halogen-containing iron-bearing compounds in combination with the at least one iron-bearing halide, where the one or more non-halogen-containing iron-bearing compounds are selected from iron (III) oxide, iron (II) carbonate, iron (II) oxide, or mixtures of two or more thereof.

17. The method of claim 11, further comprising supplying iron (II) carbonate in combination with the at least one iron-bearing halide.

18. The method of claim 11, further comprising supplying iron (II) carbonate in combination with one or more of iron (II) bromide or iron (III) bromide.

19. A method for sequestering one or more potassium and/or sodium compounds, or potassium- and/or sodium-containing compounds, in the form of one or more less reactive sodium aluminosilicate-containing, or potassium aluminosilicate-containing, compounds, as well as sequestering one or more phosphorus compounds, or phosphorus-containing compounds, in the form of one or more less reactive iron-phosphorus-containing compounds while concurrently sequestering mercury, the method comprising the steps of:

(1) providing at least one kaolin-bearing compound to a combustion zone or flue gas stream of a furnace, or boiler;
(2) providing at least one iron-bearing halide compound to a combustion zone or flue gas stream of a furnace, or boiler;
(3) permitting the kaolin portion of the at least one kaolin-bearing compound to react with any gaseous potassium and/or sodium compounds, or potassium- and/or sodium-containing compounds present in the combustion zone or flue gas to form one or more less reactive sodium aluminosilicate-containing, or potassium aluminosilicate-containing, compounds;
(4) permitting the iron portion of the at least one iron-bearing halide compound to react with any gaseous phosphorus compounds, or phosphorus-containing compounds, present in the combustion zone or flue gas to form one or more less reactive iron-phosphorus-containing compounds; and
(5) permitting the halide portion of the at least one iron-bearing halide compound to react with any gaseous mercury compounds, or mercury-containing compounds, present in the combustion zone or flue gas.

20. The method of claim 19, wherein the kaolin-bearing compound is selected from one or more kaolin-containing clays, kaolinite-containing clays, kaolinite, or mixtures of two or more thereof.

21. The method of claim 19, wherein the kaolin-bearing compound is selected from kaolinite.

22. The method of claim 19, wherein the iron-bearing halide compound is selected from iron (II) bromide, iron (III) bromide, iron (II) chloride, iron (III) chloride, iron (II) iodide, iron (III) iodate, or mixtures of two or more thereof.

23. The method of claim 19, wherein the iron-bearing halide compound is one or more of iron (II) bromide or iron (III) bromide.

24. The method of claim 19, further comprising supplying one or more non-halogen-containing iron-bearing compounds in combination with the at least one iron-bearing halide, where the one or more non-halogen-containing iron-bearing compounds are selected from iron (III) oxide, iron (II) carbonate, iron (II) oxide, or mixtures of two or more thereof.

25. The method of claim 19, further comprising supplying iron (II) carbonate in combination with the at least one iron-bearing halide.

26. The method of claim 19, further comprising supplying iron (II) carbonate in combination with one or more of iron (II) bromide or iron (III) bromide.

* * * * *